United States Patent
D'Angelo et al.

(10) Patent No.: US 7,305,583 B2
(45) Date of Patent: Dec. 4, 2007

(54) COMMAND INITIATED LOGICAL DUMPING FACILITY

(75) Inventors: Dario D'Angelo, Los Gatos, CA (US); Thomas R. Sullivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/637,329

(22) Filed: Aug. 8, 2003

(65) Prior Publication Data

US 2005/0034018 A1 Feb. 10, 2005

(51) Int. Cl.
*G06F 11/00* (2006.01)
*G06F 11/36* (2006.01)

(52) U.S. Cl. .................... 714/15; 714/21; 714/37; 714/38; 707/200

(58) Field of Classification Search .................... 714/21
See application file for complete search history.

(56) References Cited

U.S. PATENT DOCUMENTS

| | | | | |
|---|---|---|---|---|
| 4,628,511 A * | 12/1986 | Stitzlein et al. | ............... | 714/45 |
| 4,751,702 A * | 6/1988 | Beier et al. | .................... | 714/13 |
| 5,127,103 A * | 6/1992 | Hill et al. | ..................... | 714/45 |
| 5,745,669 A * | 4/1998 | Hugard et al. | ................. | 714/3 |
| 5,761,739 A * | 6/1998 | Elko et al. | ................... | 711/171 |
| 5,860,115 A * | 1/1999 | Neuhard et al. | ............ | 711/147 |
| 6,141,660 A | 10/2000 | Bach et al. | ................. | 707/103 |
| 6,202,071 B1 | 3/2001 | Keene | ........................ | 707/202 |
| 6,253,200 B1 | 6/2001 | Smedley et al. | ............... | 707/4 |
| 6,330,686 B1 | 12/2001 | Denny et al. | .................. | 714/4 |
| 6,345,280 B1 | 2/2002 | Clark et al. | ................. | 707/200 |
| 6,411,969 B1 * | 6/2002 | Tam | ........................ | 707/204 |
| 6,490,595 B1 | 12/2002 | Candee et al. | .............. | 707/202 |
| 6,490,695 B1 * | 12/2002 | Zagorski et al. | .............. | 714/38 |
| 6,502,104 B2 | 12/2002 | Fung et al. | ............. | 707/103 R |
| 6,738,930 B1 * | 5/2004 | Medin et al. | .................. | 714/30 |
| 6,845,392 B2 * | 1/2005 | Koontz et al. | .............. | 709/219 |
| 2002/0062356 A1 | 5/2002 | Clarke et al. | ............... | 709/213 |
| 2002/0107902 A1 | 8/2002 | Smith | .......................... | 709/102 |
| 2002/0156930 A1 | 10/2002 | Velasquez | .................... | 709/310 |

OTHER PUBLICATIONS

Wikipedia's Storate Area Network Article Jul. 14, 2003 Revision http://en.wikipedia.org/w/index.php?title=Storage_area_network& oldid=1313510& printable=yes.*
Wikipedia's Database Management System Article Jul. 25, 2003 Revision http://en.wikipedia.org/w/index.php?title=Database_management_system&oldid=1375765& printable=yes.*
Wikipedia's input/output Article Sep. 28, 2002 Revision http://en.wikipedia.org/w/index.php?title=Input/output&oldid=1418968& printable=yes.*
Wikipedia's Data Logging Article Aug. 10, 2002 Revision http://en.wikipedia.org/w/index.php?title=Data_loggin& oldid=3245797& printable=yes.*
Wikipedia's Computer File Article Jun. 1, 2003 Revision http://en.wikipedia.org/w/index.php?title=Computer_file& oldid=1273914& printable=yes.*

(Continued)

*Primary Examiner*—Scott Baderman
*Assistant Examiner*—Joseph Schell
(74) *Attorney, Agent, or Firm*—Kunzler & McKenzie

(57) ABSTRACT

Diagnostic information is produced from a computer memory operably connected to a DBMS. A command is received from a user wherein the command comprises an identifier of a resource associated with the DBMS. The identifier is utilized to determine one or more control blocks residing within the computer memory and wherein the one or more control blocks are related to the resource. The memory locations occupied by the one or more control blocks are determined and the contents of the memory locations are then copied to a target destination. In this manner, the target destination forms a logical dump containing the diagnostic information.

30 Claims, 8 Drawing Sheets

OTHER PUBLICATIONS

Ohkura, S.; "Dedicated Restart Member for Sysplex", Research Disclosure n453, Article 126, p. 105, Jan. 2002.

lai et al.; *"Information Management System/Enterprise Systems Architecture 5.1 Open Transaction Manager Access Logging Improvement"*, IBM Technical Disclosure Bulletin, v40 n08, Aug. 1997, p. 59-61.

Battershell, et al.; *"IMS/ESA Shared Queues; A Planning Guide"*, International Business Machines Corporation, Publication SG24-5257-00, Chapter 5-7, pp. 35-62, Dec. 1998 http://www.redbooks.ibm.com.

System Automation for OS/390; "IMS Automation Programmer's Reference and Operator's Guide", International Business Machines Corporation, Publication SC33-7045-00, Chapter 11-12, pp. 185-189, Oct. 2000 http://www-1.ibm.com/servers/eserver/zseries/software/sa/bkserv/.

* cited by examiner

COMMAND INITIATED LOGICAL DUMPING FACILITY

FIELD OF INVENTION

The present invention relates generally to debugging activities related to DBMS (Database Management Systems) processing such as IMS (Information Management System). IMS is a trademark of International Business Machines Corporation in the United States, other countries, or both.

More specifically, the present invention relates to a method, program product and apparatus to assist system administrators and other support personnel in obtaining logical dumps of DBMS memory pertaining to one or more identified DBMS resources.

BACKGROUND

Large enterprises throughout the world rely on mainframe computers running sophisticated Database Management Systems and applications to mange data critical to the survival and growth of their business. One such Database Management System is IMS. IMS is a Hierarchical Database Management System (HDBMS) developed by International Business Machines Corporation. IMS has wide spread usage in many large enterprises where high transaction volume, reliability, availability and scalability are of the utmost importance. IMS, therefore, is particularly relevant to the teachings contained herein where any disruption to processing may have catastrophic implications.

Accordingly, when any problem or disruption of IMS processing occurs, finding the cause and taking corrective action is typically a very high priority task within the enterprise. This error analysis phase frequently involves taking a console dump of the entire DBMS address space, which in the case of IMS is the IMS Control region address space, to diagnose the problem. This dump may contain the critical information that is desirable, or even essential, to resolving the problem at hand.

The IMS console dump is typically written to the SYS1.DUMP data set. The amount of data written to the SYS1.DUMP data set, representing information available for all IMS resources, may be very large. In these cases, IMS transaction processing and corresponding user response times may be substantially degraded for several minutes until the writing to SYS1.DUMP is complete. The overall performance of the operating system in which DBMS is executing may also be negatively impacted because of the extensive I/O operations involved in completing the dumping operation.

Furthermore, the space allocated to receive the console dump may be too small to receive all of the dumped memory. In this case, the console dump operation may fail to capture essential information within the partially recorded data necessitating a complete repeat of the dumping operation along with a repeat of the incumbent disruption to the IMS user.

Further still, a large console dump will also consume a vast quantity of disk storage. For many enterprises, disk storage is a scarce resource representing a significant portion of the Information Technology (IT) budget to install and manage. Network resources may also be negatively impacted in that the console dump is frequently transmitted to an off-site support center for analysis.

Accordingly, there is a great need to provide a more efficient and cost effective method for obtaining required information to facilitate failure analysis tasks related to real or perceived problems within the operation of a DBMS.

SUMMARY OF THE INVENTION

To overcome the limitations in the prior art briefly described above, the present invention provides a method, computer program product, and system to assist system administrators and other support personnel in obtaining logical dumps of DBMS memory pertaining to one or more identified DBMS resources.

Diagnostic information is produced from a computer memory operably connected to a DBMS. A command is received from a user wherein the command comprises an identifier of a resource associated with the DBMS. The identifier is utilized to determine one or more control blocks residing within the computer memory and wherein the one or more control blocks are related to the resource. The memory locations occupied by the one or more control blocks are determined and the contents of the memory locations are then copied to a target destination. In this manner, the target destination forms a logical dump containing the diagnostic information. A computer program embodying the above steps is hereinafter referred to as a Logical Dumping Facility (LDF).

In another embodiment of the present invention, the above-described processing may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for obtaining diagnostic information from a DBMS is also disclosed. A target destination is indicated and this target destination indication is made available to a Logical Dumping Facility. A resource associated with the DBMS is indicated and this resource indication is made available to the Logical Dumping Facility. The Logical Dumping Facility is invoked, whereby the target destination indication and the resource indication are utilized by the Logical Dumping Facility to produce a logical dump. The logical dump contains diagnostic information associated with the resource, and wherein the logical dump is formed at the target destination.

In this manner, relevant diagnostic information related to a specific DBMS resource may be easily and efficiently obtained without burdening the DBMS or operating system in the production of vast quantities of information irrelevant to the problem at hand.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a method, computer program product, and system to facilitate system administrators and other support personnel in obtaining logical dumps of DBMS memory pertaining to one or more identified DBMS resources. The term "logical dump", as used herein, defines a collection of information occupying discontiguous areas of computer memory. This collection of information is, however, logically related and associated with a specified DBMS resource. There is a high probability that such a collection of information contains valuable and/or essential diagnostic information.

The teaching of the present invention provides for an efficient way to obtain a relatively small quantity of diagnostic information with a high probability of being sufficient to analyze and resolve a particular problem that is motivating the acquisition of diagnostic information. Through user commands, resources relevant to the problem at hand are identified to a logical dumping facility whereby intelligent selection of information related to the identified resources are extracted and made available to the user in a variety of mediums. In bypassing the step of obtaining a comprehensive physical memory dump, as is typically performed in the prior art, a significant amount of time and money may be saved. The drudgery of sifting through vast quantities of irrelevant information is eliminated, as well as eliminating the wasteful computer resource expenses associated with the storage, retrieval and handling of this additional unneeded information In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
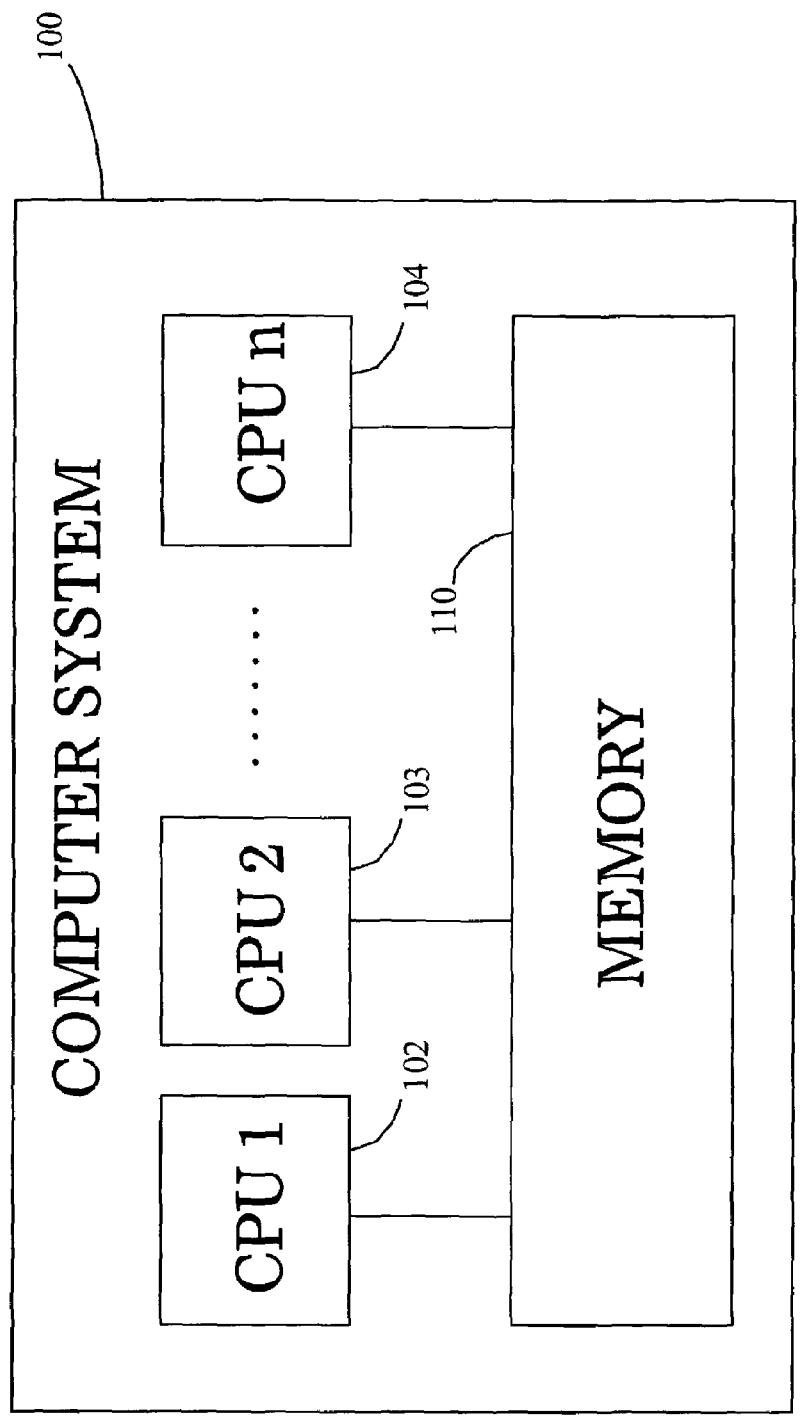
FIG. 1 is a block diagram of a typical computer system wherein the present invention may be practiced.

FIG. 1 is a block diagram of a computer system 100, such as the zSeries mainframe computer system. (zSeries is a trademark of International Business Machines Corporation in the United States, other countries, or both.) The computer system 100 comprises one or more central processing units (CPUs) 102, 103, and 104. The CPUs 102-104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, any other alternative computing environments may be used without departing from the spirit and scope of the present invention.

Figure 2:
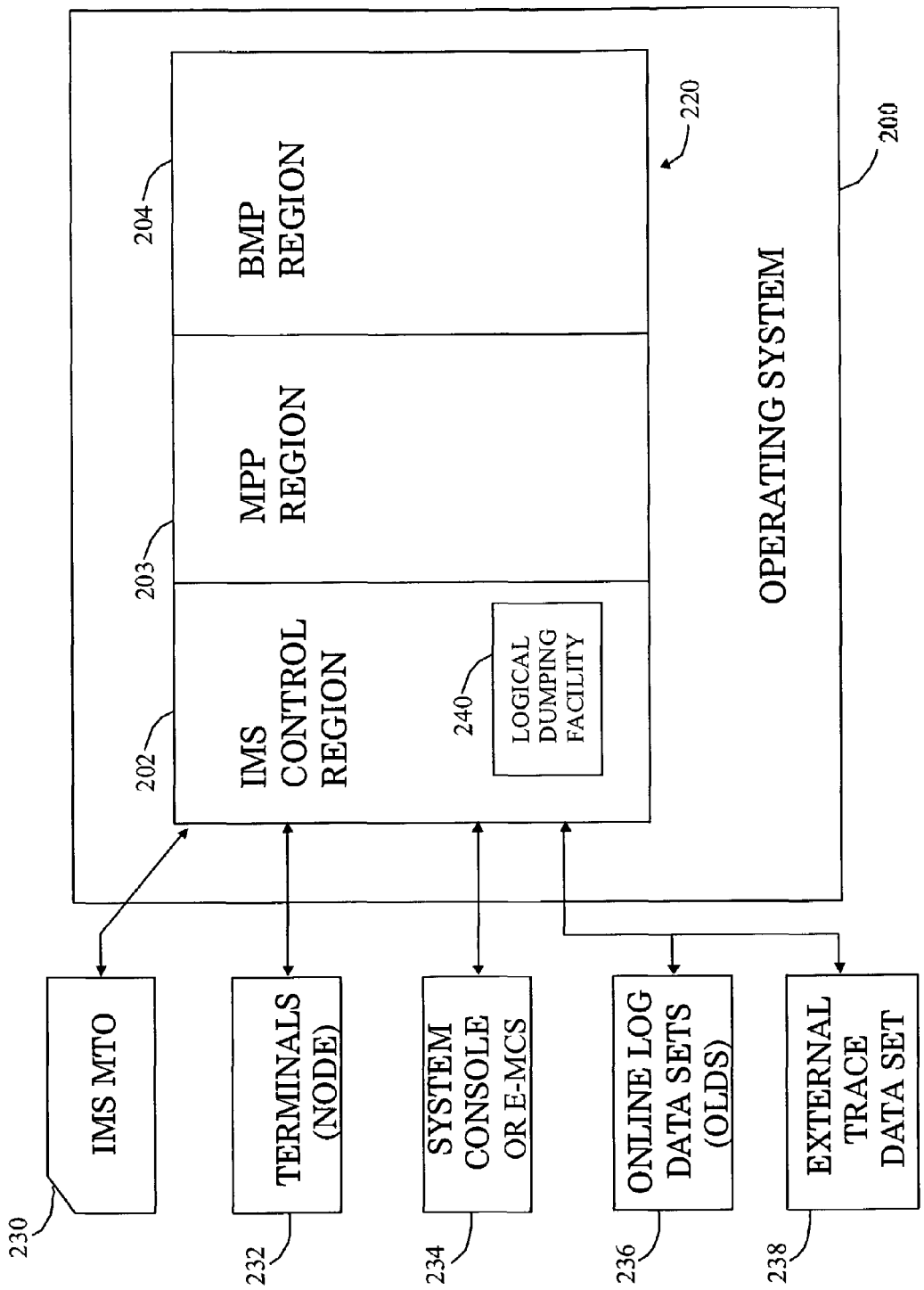
FIG. 2 is a block diagram of an exemplary IMS subsystem.

Referring now to FIG. 2, block diagram 200 illustrates an exemplary computing environment wherein diagnostic information is provided to a user in the form of a logical dump associated with an identified resource and triggered by a user command. Operating system 200, such as the z/OS operating system, is suitable for managing the resources of computer system 100 and providing the framework for running other computing subsystems and application programs. (z/OS is a trademark of International Business Machines Corporation in the United States, other countries, or both.) Subsystems functionally capable of being provided under the z/OS operating system include the IMS subsystem 220. The IMS subsystem 220 comprises an IMS Control region 202, which manages the region resources comprising Message Processing Program (MPP) region 203 and Batch Message Program (BMP) region 204. Other resources that communicate with, or are managed by, IMS subsystem 220 comprise terminals 232, IMS MTO 230, Online Log Data Sets (OLDS) 236, External Trace Data Set 238 and System Console or E-mcs 234. Those of ordinary skill in the art will recognize that numerous other IMS resources may be present, but are omitted here as their inclusion is not required for a clear understanding of the present invention.

IMS Control Region 202 invokes logical Dumping Facility 240. In the preferred embodiment, Logical Dumping Facility 240 is integrated within IMS Control Region 202; however, those of ordinary skill in the art will recognize that Logical Dumping Facility 240 may also be packaged outside of IMS Control Region 202 and be viewed as a tool or utility program operating under the direct control of operating system 200.

Logical Dumping Facility 240 receives control from IMS Control Region 202 whenever IMS Control Region 202 detects the presence of a logical dump key word when parsing a user command. The subsequent processing of Logical Dumping Facility 240 is described in detail infra in conjunction with flow diagrams 400, 500, 600 and 700 of FIGS. 4, 5, 6 and 7, respectively.

Those of ordinary skill in the art will recognize that FIG. 2 is exemplary in nature and that many other system configurations are possible within the scope of the present invention. For example, in an alternative IMS configuration other regions, such as an Interactive Fast Path (IFP) region, could also exist.

Generally, the novel methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, or media. Examples of a computer readable device or media include, but are not limited to, palpable physical media such as a CD ROM, diskette, hard drive and the like.

Figure 3:
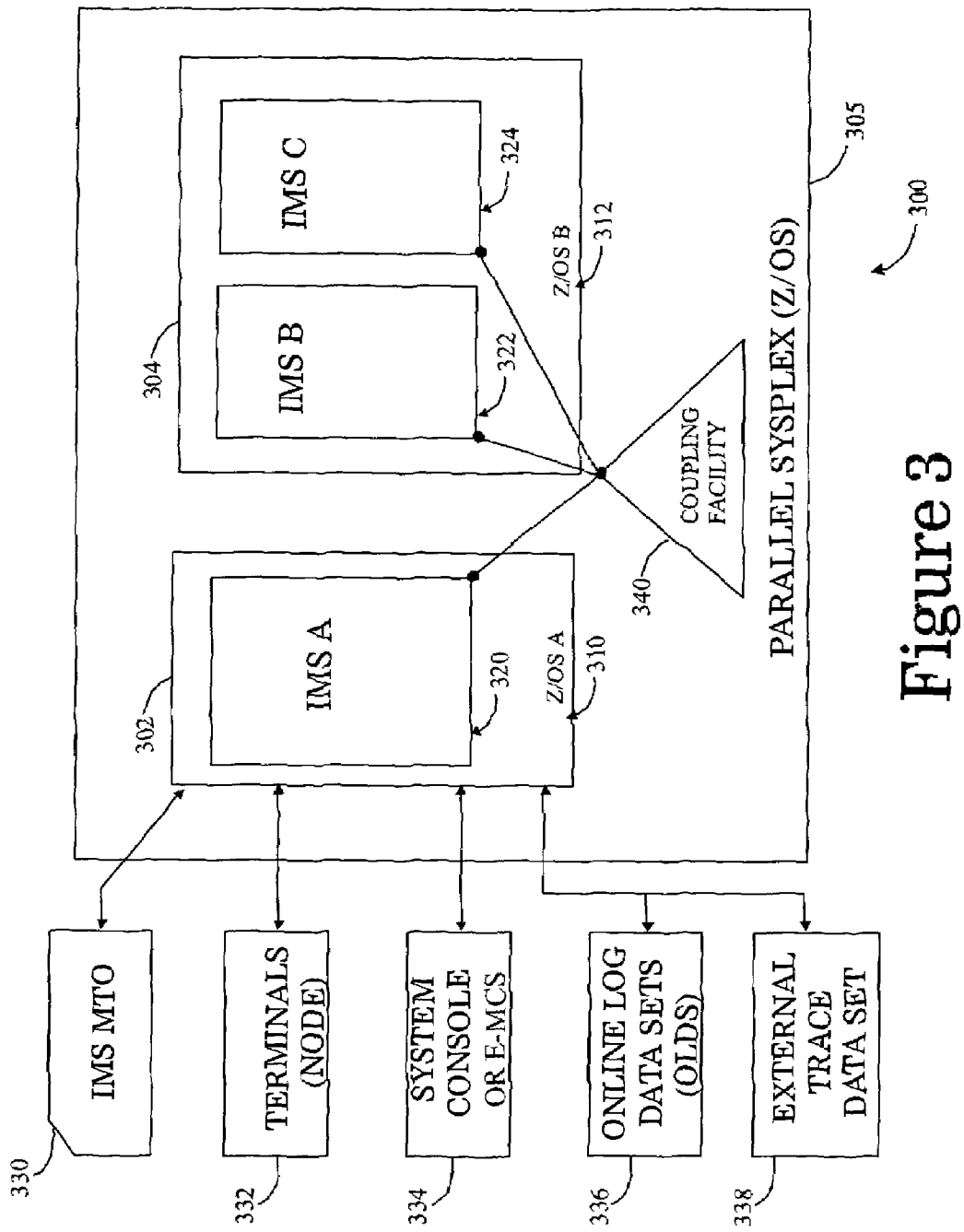
FIG. 3 is a block diagram of an exemplary IMSplex.

Referring now to FIG. 3, block diagram 300 illustrates an alternative computing environment for practicing the present invention, known in the art as an IMSplex 300. IMSplex 300 expands the single IMS system 220, shown in FIG. 2, to a plurality of IMS systems shown in FIG. 3 as IMS A 320, IMS B 322 and IMS C 324. IMS A 320 executes under the control of operating system Z/OS A 310. IMS B and IMS C execute under the control of operating system Z/OS B 312. Z/OS A 310 is coupled to Z/OS B 312 via Coupling Facility 340 to form Parallel Sysplex 305. In similar fashion to IMS 220, FIG. 2, IMSplex 300 manages or communicates with numerous other resources, such as terminals 332, IMS MTO 330, Online Log Data Sets (OLDS) 336, External Trace Data Set 338 and System Console or E-mcs 334. Those of ordinary skill in the art will recognize that numerous other IMS resources may be present, but are omitted in the present specification as their inclusion is not required for a clear understanding of the present invention.

Those of ordinary skill in the art will recognize that FIG. 3 is exemplary in nature and that many other parallel system configurations are possible within the scope of the present invention.

Figure 4:
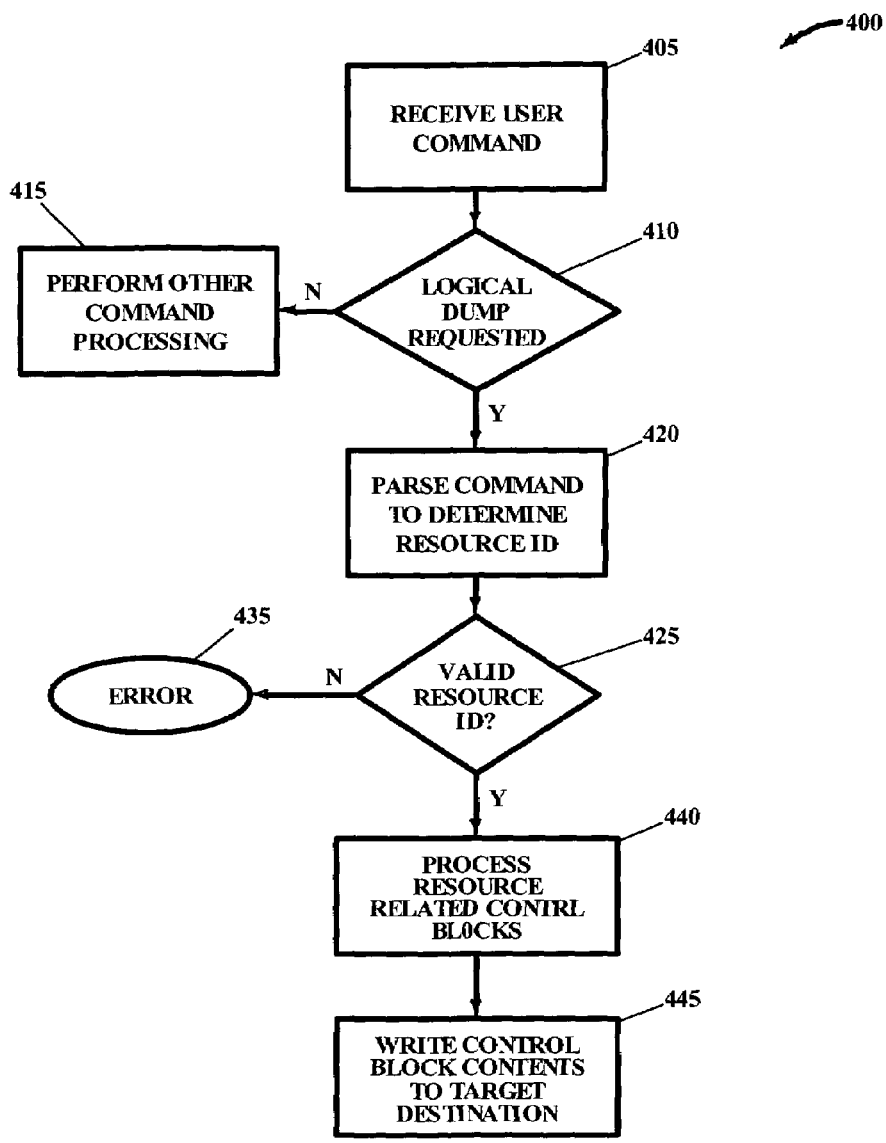
FIG. 4 is a flow diagram summarizing the high level logic of an exemplary Logical Dumping Facility.

Referring now to FIG. 4, flow diagram 400 summarizes one embodiment of a high level logical dumping facility in accordance with the present invention. In step 405, a user command is received and parsed. In step 410, if a command keyword or parameter indicates that a logical dump is being requested, then processing continues with step 420; otherwise, in step 415, the received command is processed in accordance with the nature of the request and logical dump processing is not performed at this time.

Continuing with step 420, a resource ID is determined from further parsing the received command. In step 425, a test is made to determine if the identified resource is valid. If not, processing concludes with an error at step 435. Otherwise processing continues with step 440 where all resource related control blocks are processed. (Control block processing is explained in greater detail infra in conjunction with flow diagrams 500 and 600 of FIGS. 5 and 6, respectively.) Following step 440, processing concludes at step 445 where the contents of all processed control blocks are written to a target destination to form a logical dump.

Figure 5:
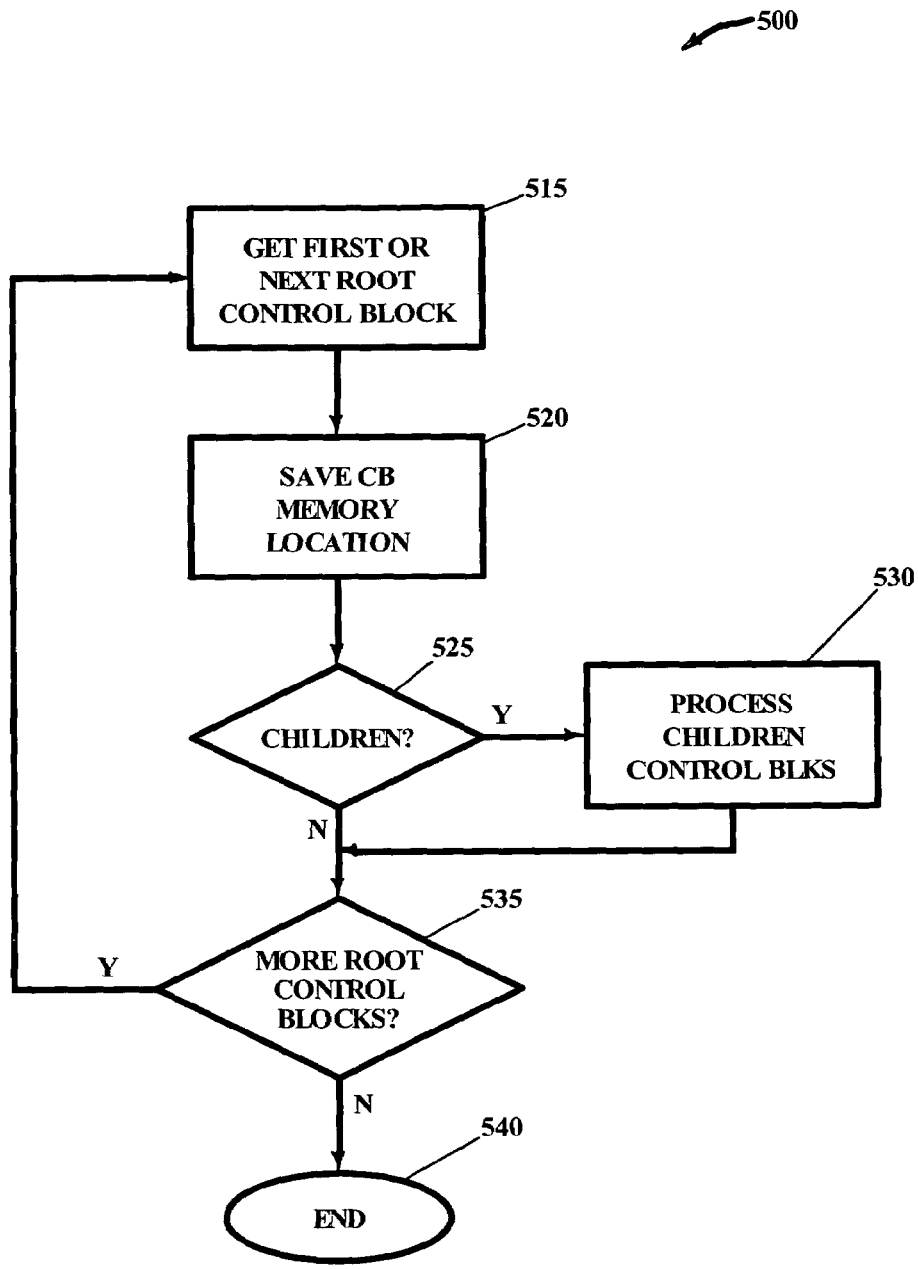
FIG. 5 is a flow diagram summarizing an exemplary control block processing routine within a Logical Dumping Facility.

Referring now to FIG. 5, flow diagram 500 summarizes additional processing detail for step 440 of flow diagram 400, FIG. 4. In step 515, the first or next "root" control block associated with the identified resource is obtained. A root control block refers to the first or highest control block within a hierarchy of control blocks. The root control block, therefore, represents a starting point from which chains or other indicators may be followed to derive the locations or names of other related control blocks from the hierarchy of control blocks. Those of ordinary skill in the art recognize that a system service is typically provided to perform the detailed processing required to locate a root control block. (In the case of a single IMS, this prior art system service is known as a FINDDEST request; within an IMSplex, this prior art system service is known as a CSLRMQRY request.) A root node is also a "parent" node with respect to the control blocks that it points to in the next lower level of the control block hierarchy, and the control block that it points to is known as a "child" control block. Those of ordinary skill in the art will recognize the terms "root", "parent" and "child", and their usual meaning within the art is intended when used within the present specification.

Continuing with step 520, the memory locations of the obtained control block are retained such that their contents may be later written to a target destination, as discussed in greater detail infra. In step 525, a test is made to determine if a "child" control block exists for the current root control block. If so, in step 530, any children control blocks associated with the current root control block are processed. This processing is explained in greater detail infra in conjunction with flow diagram 600, FIG. 6. Processing then continues with step 535.

Returning now to step 525, if no children control blocks are detected, processing continues directly with step 535 where a test is made to determine if additional root control blocks exist. If so, processing continues with step 515, discussed supra. Otherwise, processing concludes normally at step 540.

Figure 6:
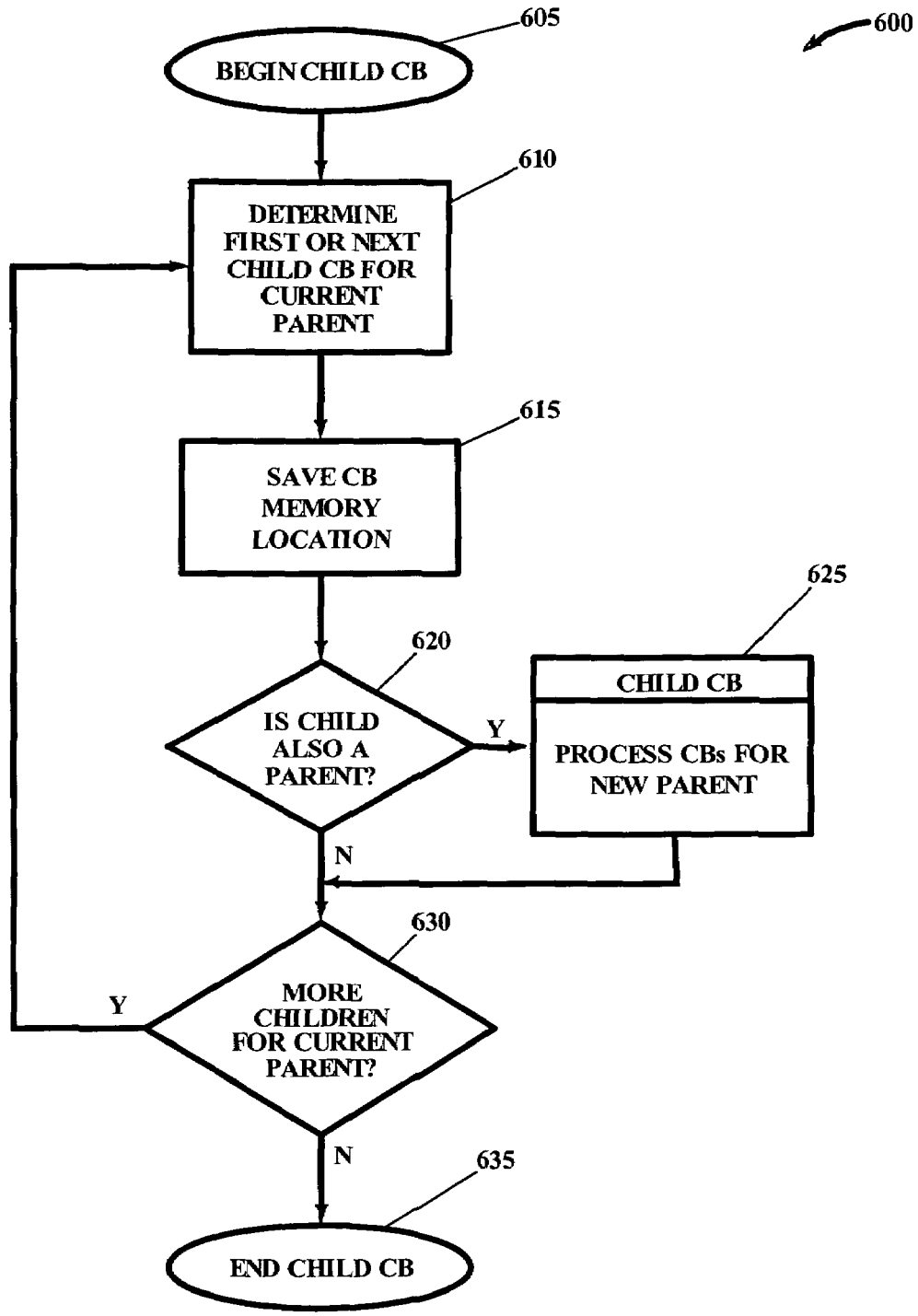
FIG. 6 is a flow diagram providing additional processing detail for an exemplary control block processing routine within a Logical Dumping Facility.

Referring now to FIG. 6, flow diagram 600 summarizes additional processing detail for step 530 of FIG. 5. In step 605, the routine "Child CB" is initiated. Those of ordinary skill in the art will recognize that "Child CB" is a recursive routine. Briefly, this means that during the processing of the Child CB routine, the Child CB routine may be invoked again prior to completing the execution associated with the first invocation. This succession of nested invocations may continue for any number of levels within the limitations of computing resources associated with the computing environment being utilized.

In step 610, the first or next child control block for the current parent control block is determined. Processing continues with step 615 where the memory locations associated with the child control block are retained for later use, as explained in greater detail infra. In step 620, a test is made to determine if the current child control block is also a parent control block. If so, in step 625, the Child CB routine is recursively called prior to continuing with step 630. Otherwise, processing continues directly with step 630 where a test is made to determine if an additional child control blocks exists for the current parent control block. If so, processing returns to step 610, discussed supra. Otherwise, processing is complete and normal termination of processing occurs at step 635.

Figure 7:
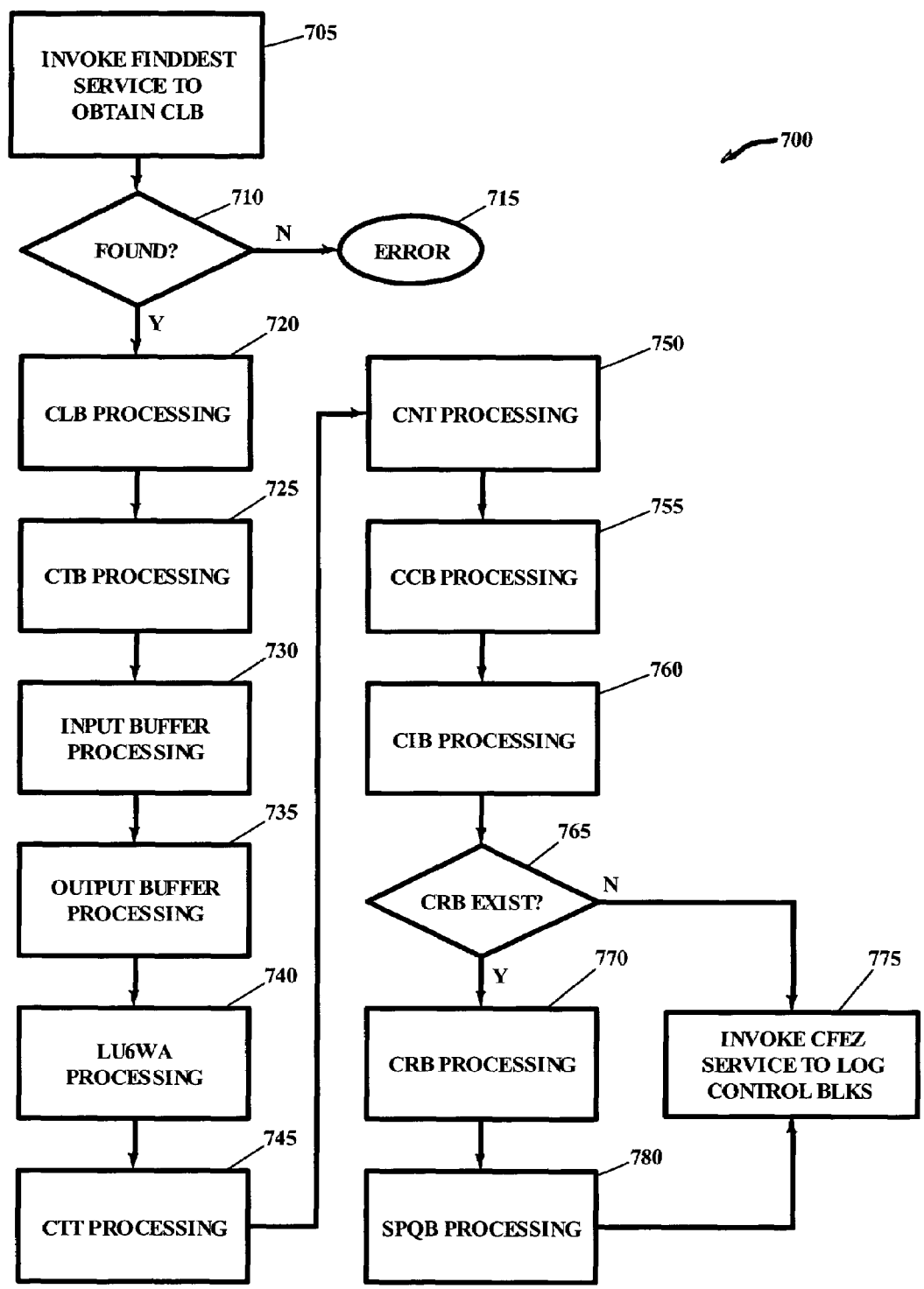
FIG. 7 illustrates an exemplary flow diagram for producing the exemplary IMS logical dump illustrated in FIG. 8.
Figure 8:
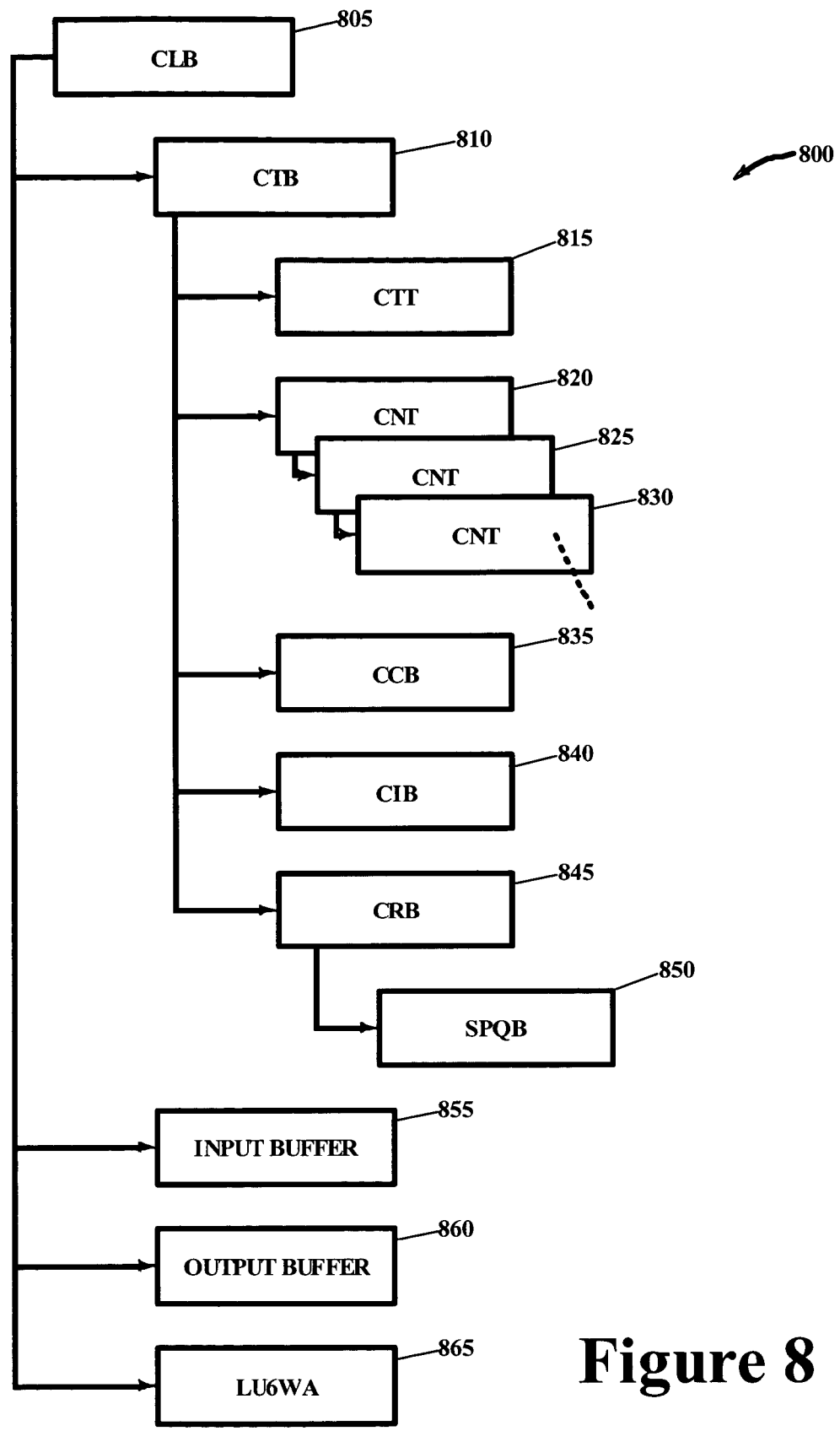
FIG. 8 illustrates an exemplary logical dump in an IMS DBMS environment.

Referring now to FIG. 7, flow diagram 700 summarizes processing detail for an exemplary logical dump generation in a single IMS environment wherein the logical dump is associated with failed IMS node 232. The logical dump generated in this example in depicted in graphical form in block diagram 800, FIG. 8.

In step 705, the IMS FINDDEST routine is invoked, and passed an identifier for the failed node resource 232, which was identified to the logical dumping routine via a user command. In step 710, a test is made to determine if CLB 805 was found by the FINDDEST invocation in step 705. If not, an error condition is generated and processing terminates at step 715. Otherwise, processing continues at step 720, where processing occurs for CLB (Communication Line Block) 805. Control Block processing is discussed supra in conjunction with flow diagrams 400, 500 and 600 of FIGS. 4, 5 and 6, respectively.

In like fashion, processing occurs for CTB (Communication Terminal Block) 810 in step 725. If present, Input Buffer 855 is processed in step 730 and, if present, Output Buffer 860 is processed in step 735. Next, in step 740, LU6WA 865 is processed, if present.

Continuing with step 745, CTT (Communications Translate Table) 815 is processed. In step 750, if present, a variable number of CNTs (Communication Name Tables) 820, 825 and 830 are processed. Next, in step 755, CCB (Conversational Control Block) 835 processing occurs if CCB 835 is present. In step 760, CIB (Communication Interface Block) processing occurs for CIB 840 if CIB 840 exists.

Now, in step 765, a test is made to determine if a CRB (Communication Restart Block) exists. If so, CRB 845 is processed in step 770, and in step 780 SPQB (Subpool Queue Block) 850 is processed if it exists. Then, in step 775, IMS service CFEZ is invoked to log the contents of all processed control blocks. Returning to step 765, if CRB 845 does not exist, then processing goes directly to step 775, discussed supra.

Those of ordinary skill in the art will recognize that the disclosed order of processing is exemplary and that any other order of processing of the control blocks is considered to be within the spirit and scope of the present invention. Furthermore, those of ordinary skill in the art will also recognize that invoking IMS service CFEZ to log the contents of processed control blocks is also exemplary. Indeed, the content of these control blocks may be written to any target destination to form a logical dump. Some representative examples include writing the control block contents to a display, a printer, a file or a communication network.

Taken in combination, flow diagrams 400, 500, 600 and 700 in conjunction with supporting diagrams and detailed descriptions, provide for improved efficiency and reduced cost in generating relevant diagnostic information for use in DBMS problem resolution. Utilizing the teachings contained herein resources relevant to a problem at hand are identified to a logical dumping facility whereby intelligent selection of information related to the identified resources are extracted and made available to the user in a variety of mediums. The drudgery of sifting through vast quantities of irrelevant information is eliminated, as well as eliminating the wasteful expenses associated with the resources required for storage, retrieval and handling of unneeded information References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for producing diagnostic information from a computer memory operably connected to an Information Management System (IMS) Database Management System (DBMS) comprising:
   receiving from a user a run-time command wherein said command comprises an identifier of an IMS resource associated with said IMS DBMS;
   utilizing said identifier to determine one or more control blocks within a hierarchy of control blocks residing within said computer memory wherein said one or more control blocks are related to said IMS resource;
   determining the memory locations occupied by said one or more control blocks; and
   copying the contents of said memory locations to a target destination whereby said target destination forms a logical dump containing said diagnostic information.

2. The method of claim 1 wherein said target destination is a file.

3. The method of claim 2 wherein said file is a SYS1.DUMP data set.

4. The method of claim 1 wherein said target destination is a log.

5. The method of claim 4 wherein said log is an IMS OLDS.

6. The method of claim 1 wherein said target destination is a network transmission.

7. The method of claim 1 wherein said target destination is a computer display.

8. The method of claim 1 wherein said target destination is a printer.

9. A method for obtaining diagnostic information from an Information Management System (IMS) Database Management System (DBMS) comprising:
   indicating a target destination and making said target destination indication available to a Logical Dumping Facility;
   indicating an IMS resource associated with said IMS DBMS and making said resource indication available to said Logical Dumping Facility; and
   invoking said Logical Dumping Facility whereby said target destination indication and said resource indication are utilized by said Logical Dumping Facility to produce a logical dump containing diagnostic information associated with said IMS resource, and wherein said logical dump is formed at said target destination.

10. The method of claim 9 wherein said Logical Dumping Facility is integrated with the IMS DBMS.

11. A computer system for producing diagnostic information from a computer memory operably connected to an Information Management System (IMS) Database Management System (DBMS) comprising:
   a computer;
   means for receiving from a user a run-time command wherein said command comprises an identifier of an IMS resource associated with said IMS DBMS;
   means for utilizing said identifier to determine one or more control blocks within a hierarchy of control blocks residing within said computer memory wherein said one or more control blocks are related to said IMS resource;
   means for determining the memory locations occupied by said one or more control blocks; and
   means for copying the contents of said memory locations to a target destination whereby said target destination forms a logical dump containing said diagnostic information.

12. The computer system of claim 11 wherein said target destination is a file.

13. The computer system of claim 12 wherein said file is a SYS1.DUMP data set.

14. The computer system of claim 11 wherein said target destination is a log.

15. The computer system of claim 14 wherein said log is an IMS OLDS.

16. The computer system of claim 11 wherein said target destination is a network transmission.

17. The computer system of claim 11 wherein said target destination is a computer display.

18. The computer system of claim 11 wherein said target destination is a printer.

19. An article of manufacture for use in a computer system tangibly embodying computer instructions executable by said computer system to perform process steps for producing diagnostic information from a computer memory operably connected to an Information Management System (IMS) Database Management System (DBMS) comprising:
   receiving from a user a run-time command wherein said command comprises an identifier of an IMS resource associated with said IMS DBMS;
   utilizing said identifier to determine one or more control blocks within a hierarchy of control blocks residing within said computer memory wherein said one or more control blocks are related to said IMS resource;

determining the memory locations occupied by said one or more control blocks; and copying the contents of said memory locations to a target destination whereby said target destination forms a logical dump containing said diagnostic information.

20. The article of manufacture of claim 19 wherein said target destination is a file.

21. The article of manufacture of claim 20 wherein said file is a SYS1.DUMP data set.

22. The article of manufacture of claim 19 wherein said target destination is a log.

23. The article of manufacture of claim 22 wherein said log is an IMS OLDS.

24. The article of manufacture of claim 19 wherein said target destination is a network transmission.

25. The article of manufacture of claim 19 wherein said target destination is a computer display.

26. The article of manufacture of claim 19 wherein said target destination is a printer.

27. A method for producing diagnostic information from a computer memory operably connected to an Information Management System (IMS) Database Management System (DBMS) comprising:

receiving from a user a run-time command wherein said command comprises an identifier of an IMS resource associated with said IMS DBMS;

utilizing said identifier to determine one or more control blocks within a hierarchy of control blocks residing within said computer memory wherein said one or more control blocks are related to said IMS resource;

determining the memory locations occupied by said one or more control blocks; and copying the contents of said memory locations to a target destination whereby said target destination forms a SYS1.DUMP data set containing said diagnostic information.

28. The method of claim 27 wherein said target destination is a file.

29. The method of claim 27 wherein said target destination is a log.

30. The method of claim 29 wherein said log is an IMS OLDS.

* * * * *